No. 649,813. Patented May 15, 1900.
H. I. CHUBB.
INSIDE PIPE CLAMP.
(Application filed Feb. 12, 1900.)
(No Model.)
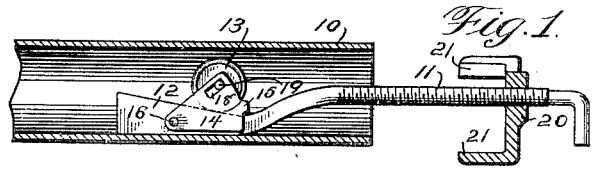
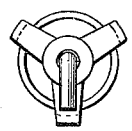
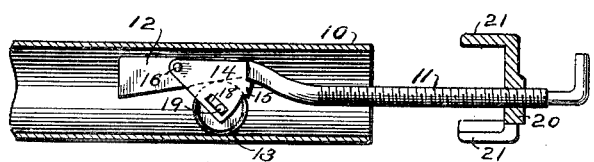
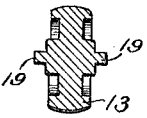
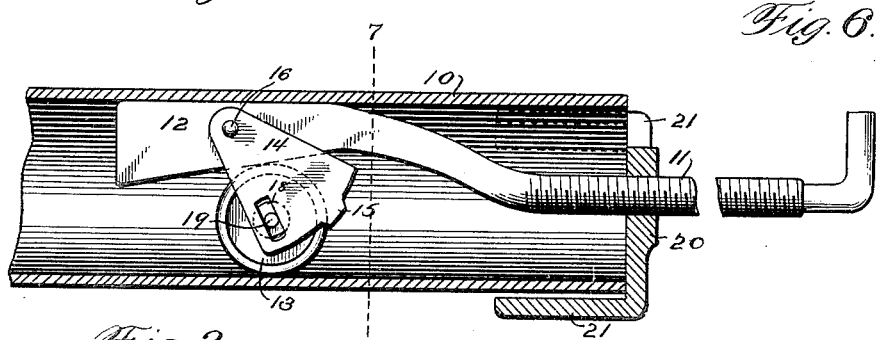
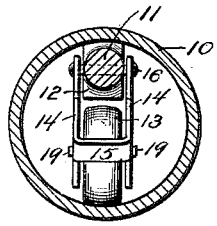
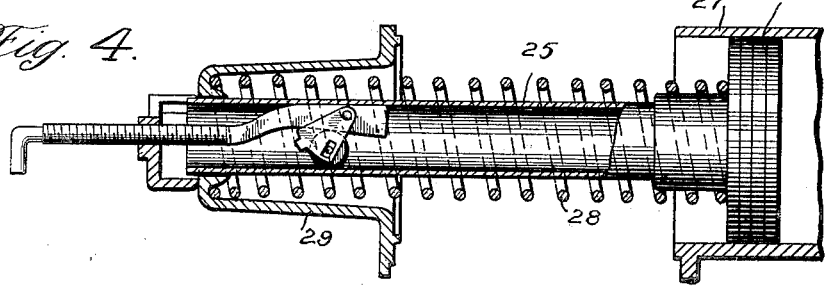
Witnesses
F. G. Campbell.
Geo. H. Chandler.
Henry I. Chubb, Inventor.
By his Attorneys,
C. A. Snow & Co.
THE NORRIS PETERS CO., PHOTO-LITHO., WASHINGTON, D. C.

UNITED STATES PATENT OFFICE.

HENRY I. CHUBB, OF MICHIGAN CITY, INDIANA, ASSIGNOR OF ONE-HALF TO JOHN G. RILEY, OF CHICAGO, ILLINOIS.

INSIDE PIPE-CLAMP.

SPECIFICATION forming part of Letters Patent No. 649,813, dated May 15, 1900.

Application filed February 12, 1900. Serial No. 4,991. (No model.)

*To all whom it may concern:*

Be it known that I, HENRY I. CHUBB, a citizen of the United States, residing at Michigan City, in the county of La Porte and State of Indiana, have invented a new and useful Inside Pipe-Clamp, of which the following is a specification.

This invention relates to pipe-clamps in general, and more particularly to that class of inside pipe-clamps in which the clamp is inserted in the pipe and is then expanded to frictionally engage the inner face of the pipe, the object of the invention being to provide a construction which while being adapted for clamping pipes and tubes of all kinds will be particularly useful and convenient for removing air-brake pistons, such as are commonly used in railway equipment.

A further object of the invention is to provide means for holding the cylinder-head of an air-brake from being thrown violently outward against the operator, under the influence of the piston-spring, when the head is loosened to remove the piston for cleansing or repair.

In the drawings forming a portion of this specification, and in which similar numerals of reference designate like and corresponding parts in the several views, Figure 1 is a longitudinal section of a portion of a pipe and showing in elevation the position of the clamp when first introduced and prior to its engagement with the pipe. Fig. 2 is a view similar to Fig. 1 and showing the position of the clamp when it is reversed and prior to its engagement. Fig. 3 is an enlarged view similar to Figs. 1 and 2 and showing the positions of the parts when the clamp is engaged with the pipe or tube. Fig. 4 is a view partially in section and partially in elevation and showing the engagement of the tool with the tubular stem of the piston of an air-brake and showing also a portion of the piston-cylinder and illustrating the position of the cylinder-head upon the stem of the piston when disengaged from the cylinder. Fig. 5 is an end view of a tube with the clamp engaged therewith. Fig. 6 is a central section of the rollers of the clamp. Fig. 7 is a section on line 7 7 of Fig. 3 and showing parts in elevation.

Referring now to the drawings, and more particularly to Figs. 1, 2, and 3, 10 represents a tube or pipe with which the clamp is to be engaged. The clamp consists of a threaded stem 11, one end of which is curved upwardly and forwardly and terminates in a truncated triangular head 12, the outer face of which lies parallel with the axis of the stem 11, while its inner face lies at an angle thereto to form a wedge. This wedge-shaped head 12 operates in conjunction with a roller, with respect to which it is movable, so that the roller will travel along its inclined face, and thus move with its outermost point toward and away from the opposite face of the head. This wedging-roller, as shown at 13, is slidably and rotatably mounted in a carrier, which consists of two substantially-triangular plates 14, having preferably-curvilinear bases and which bases are mutually connected by a web 15, extending at right angles thereto. The narrowed extremities of the plates 14 are disposed to lie on opposite sides of the head 12 and are pivotally connected therewith by means of a common pivot-pin 16, passed through the head and the plates. This carrier is therefore at liberty to swing toward and away from the stem 11.

Longitudinal slots 18 are formed in the plates 14 adjacent the curvilinear bases thereof and extending in a direction away from the bases, these slots being disposed adjacent the sides of the plates in the direction of the major end of the head 12.

The roller 13, as illustrated in Fig. 6, is preferably formed integral, and comprises trunnions 19, which engage the slots 18 to hold the roller in proper relation to the plates, and the periphery of this roller is curved transversely to secure a maximum contacting surface with the inner face of the pipe or tube. It will thus be seen that if the roller 13 be held against the inclined face of the head and the carrier is then swung in the direction of the major end of the head the roller will be forced outwardly, so that its trunnions will travel first away from and then toward the outer ends of the slots.

Upon the threaded portion of the stem 11 is engaged a follower 20, comprising a central hub, as shown, and from which radiate fingers 21, the extremities of which are bent in the same direction to lie parallel with the axis of the stem and equidistant therefrom. After the application of this follower the end of the stem is bent at right angles to form a crank or handle.

In applying this clamp to a pipe or tube the clamp is inserted in the end of the tube with the roller 13 uppermost, at which time the carrier will fall to the position shown in Fig. 1 of the drawings. This movement of the carrier will cause the roller to travel down the inclined face of the head in the direction of the narrowed end of the latter, the slots 18 permitting the movement of the trunnions 19 at the time. The tool is then reversed to the position shown in Fig. 2 and is raised to bring its flat face against the upper portion of the inner face of the tube or pipe. When the tool is thus reversed, the carrier 14 swings downwardly and forwardly in the direction of the thickened end of the head. In the position shown in Fig. 1 the trunnions of the roller lie at the outer ends of the slots 18, but they are free to slide bodily in the slots, and hence after the tool is reversed the head may be lifted against the uppermost point of the inner surface of the pipe and the roller will swing farther forward with the carrier and will bear against the inclined face of the head and against the lowermost point of the inner face of the pipe. The follower 20 is then screwed up upon the stem to engage its fingers over the end of the tube and draw the stem outwardly to wedge the head between the roller and the pipe or tube, and thus firmly grip the latter. It will of course be understood that instead of screwing up the follower to draw the stem outwardly the stem may be drawn outwardly and the follower then screwed up to engage the pipe or tube. When the follower is in the position shown in Fig. 3 of the drawings, it acts to maintain the clamp in engagement with the pipe or tube.

In Fig. 4 of the drawings the clamp is shown engaged with the tubular stem 25 of the piston 26 in a brake-cylinder 27. As is well known, this piston 26 is held normally in one position by a helical spring 28, which encircles the stem 25 and bears at its opposite ends against the piston 26 and the cylinder-head 29, respectively. In operating the clamp it is engaged with the stem 25 in the manner above described, with the ends of the fingers 21 resting against the cylinder-head 29. The cylinder-head may then be disengaged from the cylinder, and the follower 20 will prevent the spring from throwing the cylinder-head off from the stem and against the operator. It will thus be seen that with the present structure a firm grip may be secured upon the inner face of the piston-stem or upon any other tube, and that this engagement may be maintained and also that the clamp may be disengaged with ease, the structure being such as not to injure the tube or pipe in any way.

It will of course be understood that in practice various modifications of the present structure may be made to satisfy different specific conditions and that any suitable materials and proportions may be used without departing from the spirit of the invention.

What is claimed is—

1. An inside pipe-clamp comprising a wedge member having a wedge-face and a clamping-face, and a roller in contact with the wedge-face and adapted for movement thereover to force the roller outwardly with its periphery in engagement with the article to be clamped and to engage the clamping-face of the wedge member.

2. An inside pipe-clamp comprising a wedge member having a wedge-face and a gripping-face, and a roller in contact with the wedge-face and adapted for movement thereover, said roller having its outer portion uncovered for engagement with an article to be clamped.

3. An inside pipe-clamp comprising a wedge member having a wedge-face and a clamping-face, a carrier pivoted to the wedge member, and a clamping-roller rotatably and slidably mounted in the carrier and in contact with the wedge-face, and with its outer face disposed for engagement with an article to be clamped.

4. An inside pipe-clamp comprising a wedge member having a wedge-face and a clamping-face, a carrier pivoted to the wedge member and having slots therein, and a roller having trunnions engaged with the slots and adapted for movement therein to permit the roller to travel over the wedge-face of the wedge member and move toward and away from the clamping-face of the wedge member to release and engage a body to be clamped.

5. A device of the class described, comprising a threaded stem, a wedge-shaped head upon the stem, a follower engaged with the thread of the stem, plates pivotally connected with the head, said plates having oppositely-disposed slots, and a roller having trunnions engaged with the slots, the inner portion of the roller being adapted to lie against the head and the outer portion of the roller against a body to be clamped.

6. A device of the class described comprising a threaded stem, a follower engaged with the stem, a wedge-shaped head upon the stem, plates pivoted to the head and having rigid connections mutually, slots in the plates, and a roller having trunnions rotatably and slidably engaged with the slots, said roller being adapted to lie and travel against the head and to engage a body to be clamped.

In testimony that I claim the foregoing as my own I have hereto affixed my signature in the presence of two witnesses.

HENRY I. CHUBB.

Witnesses:
ISIDORE I. SPIRO,
FRED G. STASCHEN.